(12) United States Patent
Liu et al.

(10) Patent No.: US 7,905,698 B2
(45) Date of Patent: Mar. 15, 2011

(54) TWO-WAY NAILS, TWO-WAY SCREWS AND THEIR MOUNTING TOOLS

(76) Inventors: Lisong Liu, Fremont, CA (US); Jessica Sofia Liu, Fremont, CA (US)

( * ) Notice: Subject to any disclaimer, the term of this patent is extended or adjusted under 35 U.S.C. 154(b) by 238 days.

(21) Appl. No.: 12/205,181

(22) Filed: Sep. 5, 2008

(65) Prior Publication Data

US 2010/0061825 A1    Mar. 11, 2010

(51) Int. Cl.
*F16B 15/00* (2006.01)
(52) U.S. Cl. .............................. 411/458; 411/388; 81/44
(58) Field of Classification Search .............. 81/44, 491, 81/487, 385, 54.1, 157; 411/458, 460, 388, 411/389
See application file for complete search history.

(56) References Cited

U.S. PATENT DOCUMENTS

| | | | | |
|---|---|---|---|---|
| 1,851,126 A | * | 3/1932 | Mikkelsen | 29/249 |
| 3,326,254 A | * | 6/1967 | Diehl | 81/44 |
| 3,683,307 A | * | 8/1972 | Patterson | 338/99 |
| 3,729,035 A | * | 4/1973 | Manzanarez | 81/44 |
| 4,829,855 A | * | 5/1989 | Martinez | 81/44 |
| 4,874,156 A | * | 10/1989 | Goldzweig | 269/158 |
| 6,634,258 B2 | * | 10/2003 | Pool et al. | 81/9.3 |
| 2005/0051000 A1 | * | 3/2005 | McIlvenna et al. | 81/44 |

* cited by examiner

*Primary Examiner* — Gary Estremsky
(74) *Attorney, Agent, or Firm* — Tim Tingkang Xia; Morris, Manning & Martin, LLP

(57) ABSTRACT

The present invention provides mounting members useable for fastening two objects together and their mounting tools. In one embodiment, the mounting member includes a first tapered tip and an opposite, second tapered tip defining a shank therebetween, where the shank has an exterior surface and a structure formed on the exterior surface.

3 Claims, 9 Drawing Sheets

TWO-WAY NAILS, TWO-WAY SCREWS AND THEIR MOUNTING TOOLS

FIELD OF THE INVENTION

The invention generally relates to a mounting member, and particularly to two-way nails and screws and tools for mounting same.

BACKGROUND OF THE INVENTION

The most common fasteners used in construction are nails and screws. Conventional nails and screws are designed to have a head and a shank extending from the head with a tip end, which is for fast, easy insertion with positive retention. Typically, nails and screws are driven into a target material surface, with their heads exposed to the material surface. Additionally, for fastening two or more thick objects, long shank nails or screws are needed. If the shanks of nails or screws are too long, more toque force needs being applied to driven them into the thick objects. However, if the force is applied improperly, the nails or screws may be broken. Also, when tow objects are too thick, or when the nail head is not allowed to appear on the object surface, no conventional long shank nails or screws are possible.

Therefore, a heretofore unaddressed need exists in the art to address the aforementioned deficiencies and inadequacies.

SUMMARY OF THE INVENTION

In one aspect, the present invention relates to a mounting member useable for fastening two objects together. In one embodiment, the mounting member includes a first tapered tip and an opposite, second tapered tip defining a shank therebetween, where the shank has an exterior surface and a structure formed on the exterior surface.

In one embodiment, the structure comprises at least one mark for marking the distance between one of the first and second tapered tips and the at least one mark.

In another embodiment, the structure comprises a flange extending outwardly from the exterior surface at a predetermined location, where the flange is adapted for stopping the mounting member from further advancing into one object.

In one embodiment, the mounting member further includes at least one threaded portion formed on the exterior surface of the shank between one of the first and second tapered tip and the flange. The flange is further adapted for threading the mounting member into one object. In one embodiment, the flange has a ring shape or a polygonal shape. In case of a polygonal shape, at least two sides of it are larger than the shank cross section.

In another aspect, the present invention relates to a tool for holding the mounting member disclosed above. In one embodiment, the tool has a tool body having a first end portion and an opposite, second end portion, one or more recesses formed in at least one of the first and second end portions, where each of the one or more recesses is adapted for receiving a portion of the mounting member containing the first tapered tip or the second tapered tip, and a handle protruded from the tool body.

In yet another aspect, the present invention relates to a mounting member useable for fastening two objects together. The mounting member in one embodiment has a first end portion and an opposite, second end portion defining a shank therebetween, where at least one of the first and second end portions is formed with a tapered tip, and where the shank has a first portion, a second portion and a neck portion formed therebetween.

Each of the first and second portions of the shank is formed with a cylinder having a diameter, and where the neck portion of the shank is formed with a cylinder or a polygonal column having a thickness that is less than the diameter. In one embodiment, at least one of the first and second portions of the shank has a threaded exterior surface.

In a further aspect, the present invention relates to a tool for holding the mounting member disclosed above. In one embodiment, the tool has a wrench having an open-end mouth portion adapted for receiving the neck portion of the shank of the mounting member, and means for applying a force to the wrench, thereby causing the mounting member to advance into an object, where the means for applying the force comprises a tab formed on the wrench.

In yet a further aspect, the present invention relates to a tool for holding the mounting member disclosed above. The tool includes a holding member having a first end portion and a second end portion defining a body portion therebetween, where the first and second end portions have an angle of about 90° relative to the body portion, where the first end portion has an open mouth adapted for receiving the neck portion of the shank of the mounting member, and where the second end portion is adapted for applying a force to the holding member, thereby causing the mounting member to advance into an object, and a handle protruded from the body portion of the holding member.

In one aspect, the present invention relates to a tool for holding the mounting member disclosed above. The tool in one embodiment includes a first holding member, a second holding member, a first spring, a second spring and a bar.

The first holding member has a first end portion and a second end portion defining a body portion therebetween, where the first and second end portions have an angle of about 90° relative to the body portion, where the first end portion has an open mouth, and where the body portion defines an opening therethrough.

The second holding member has a first end portion and a second end portion defining a body portion therebetween, where the first and second end portions have an angle of about 90° relative to the body portion, where the first end portion has an open mouth.

The first spring connects the first and second holding member such that when the first spring is in the contracting position, the first and second end portions of the first holding member are respectively engaged with the first and second end portions of the second holding member, and the open mouths of the first and second holding members are complementarily received the neck portion of the shank of the mounting member, and when the first spring is in the expending position, the first and second end portions of the first holding member are respectively apart from the first and second end portions of the second holding member, thereby, releasing the neck portion of the shank of the mounting member received in the open mouths of the first and second holding members.

The bar is slidable through the opening of the first holding member, adapted for causing the first spring in the contracting position or the expanding position.

The second spring connects to the first holding member and the bar such that when the second spring is in its contracting position, it causes the first spring in the contracting position, and when the second spring is in its expanding position, it causes the first spring in the expanding position.

The handle is protruded from the body portion of the first holding member.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
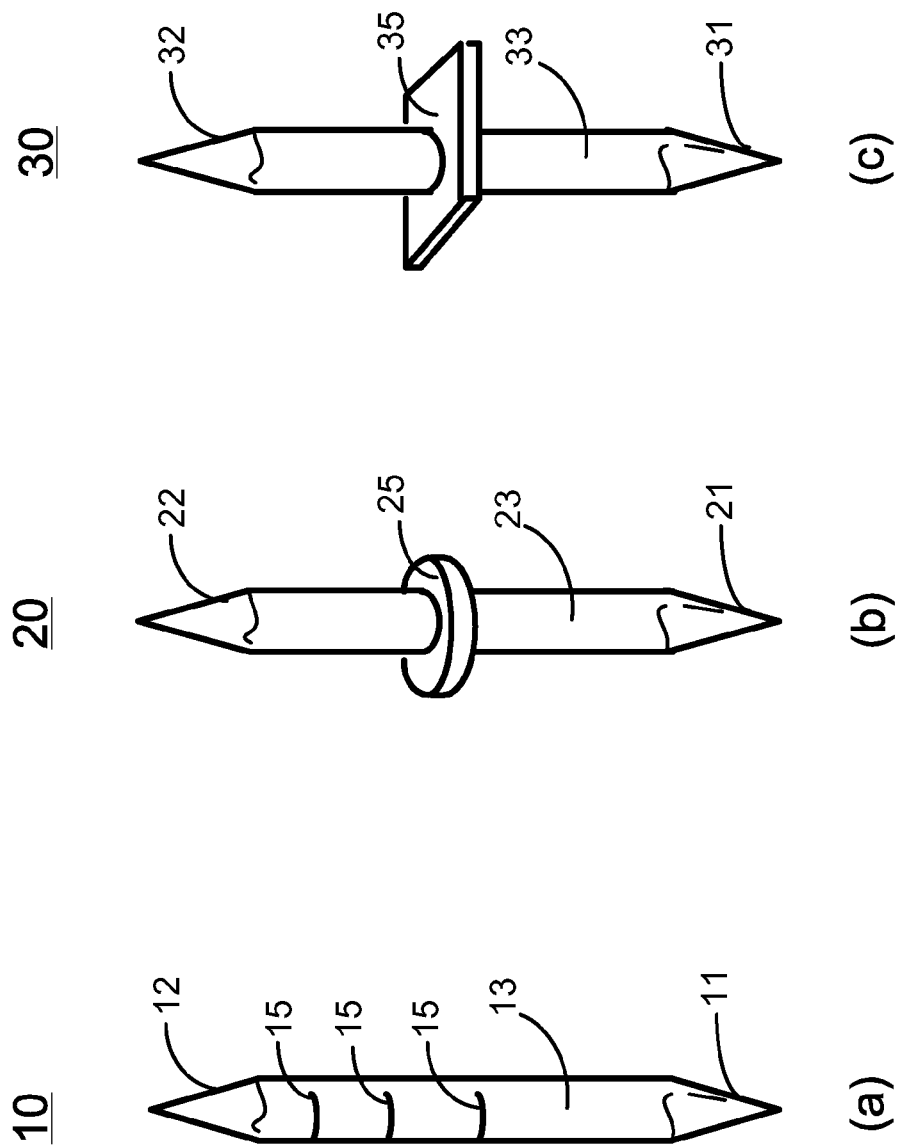
FIG. 1 shows two-way nails with depth marks and stopper according to embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Note that titles or subtitles may be used in the examples for convenience of a reader, which in no way should limit the scope of the invention.

The description will be made as to the embodiments of the present invention in conjunction with the accompanying drawings in FIGS. 1-9. In accordance with the purposes of this invention, as embodied and broadly described herein, this invention, in one aspect, relates to two-way nails and screws and tools for mounting same.

Two-Way Nails with Depth Mark(s) and Stopper

Referring to FIGS. 1(a)-1(c), three embodiments of a mounting member, i.e., a two-way mail, are shown according to three embodiments of the present invention. Each of the two-way mail 10/20/30 has a first tapered tip 11/21/31 and an opposite, second tapered tip 12/22/32 defining a shank 13/23/33 therebetween. The shank has an exterior surface and a structure 15/25/25 formed on the exterior surface.

For the two-way mail 10, the structure 15 comprises a plurality of marks for marking the distance between the first tapered tip 11 or the second tapered tip 12 and one mark. The marks can provide useful information to the user during nailing, and also, for better depth control of the nail 10.

For the two-way mail 20, the structure 25 has a flange extending outwardly from the exterior surface at a predetermined location. The flange has a ring shape, and is adapted for stopping the two-way mail 20 from further advancing into one object. For the two-way mail 30, the structure 35 has a flange that has a polygonal shape.

Applying the nail between two soft blocks or one soft block and one hard block, there is no need to recess the blocks. If both blocks are made by hard material, recessing on at least one block of the two for the space of the stopper is needed for the space of the thin stopper.

Nail Holder for Nailing the Two-Way Nails

Figure 2:
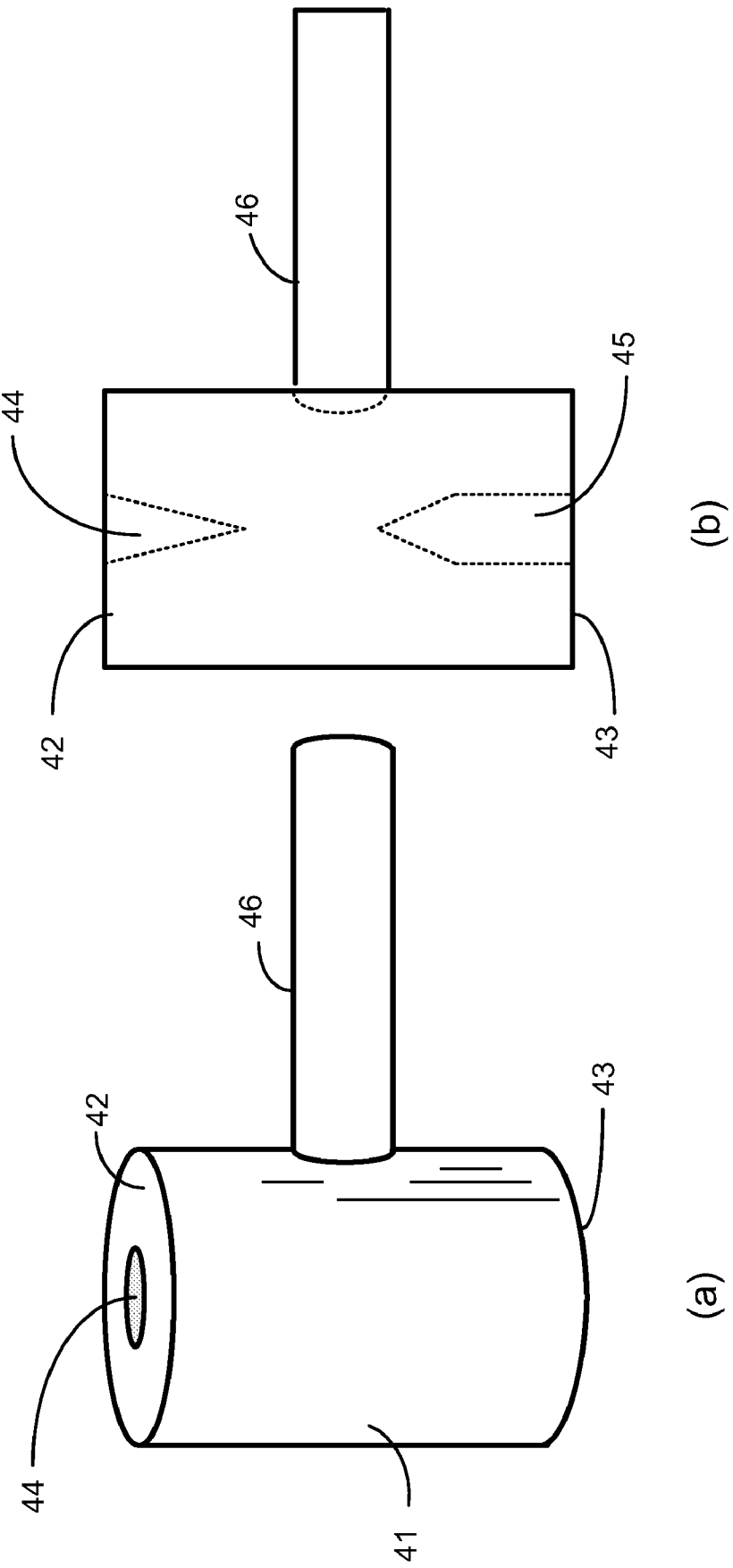
FIG. 2 shows a nail holder for the two-way nails with single hole on each side according to one embodiment of the present invention.

FIG. 2 shows a tool 40 for holding the two-way nail according to one embodiments of the present invention. The tool 40 has a tool body 41 having a first end portion 42 and an opposite, second end portion 43. One recess 44/45 is formed in at each of the first end portion 42 and the second end portion 43. The recess 44/45 is adapted for receiving a portion of a two-way nail containing the first tapered tip or the second tapered tip. The tool 40 also has a handle protruded from the tool body 41.

Figure 3:
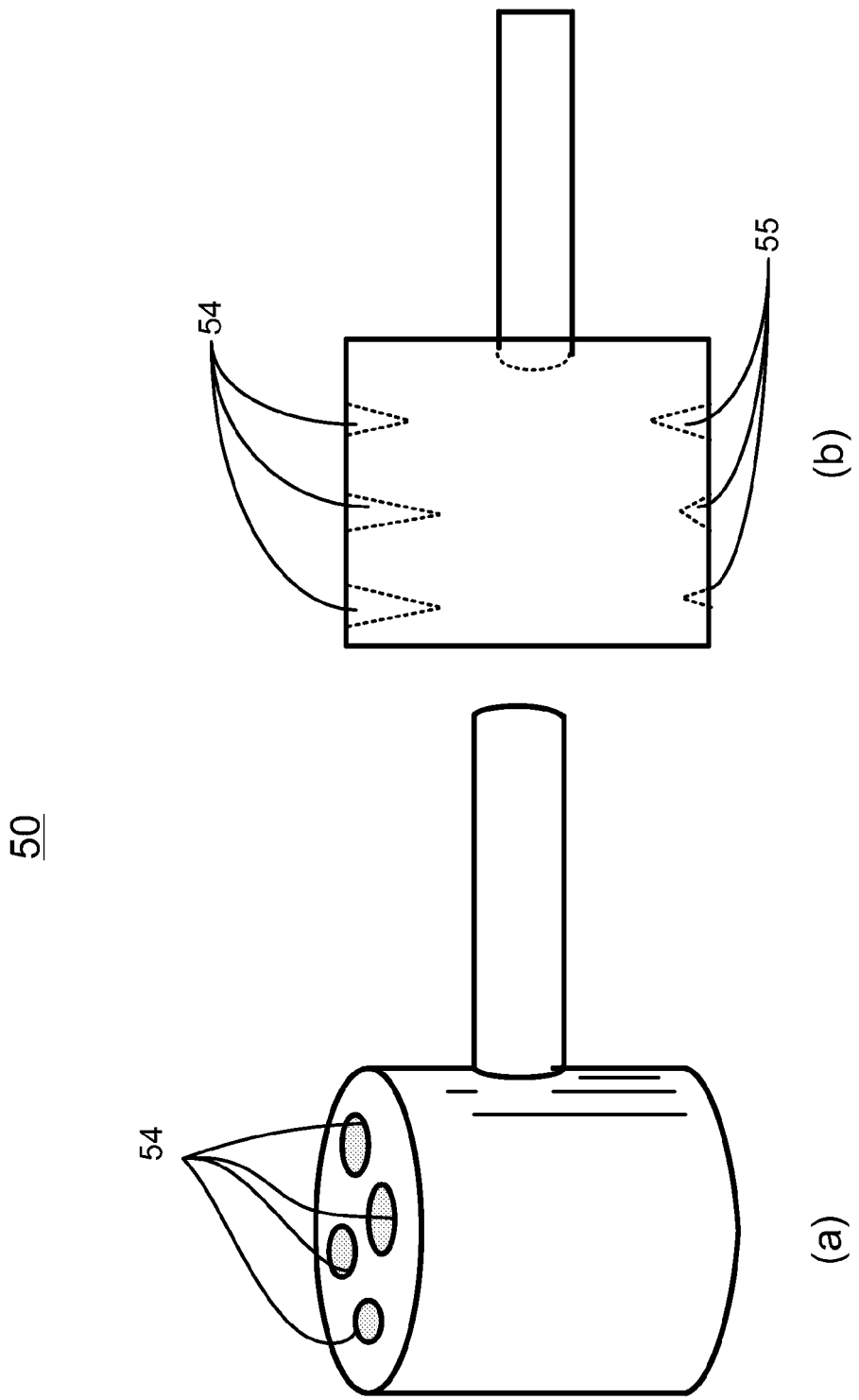
FIG. 3 shows a nail holder for the two-way nails with multiple holes on each side according to another embodiment of the present invention.

FIG. 3 shows a tool 50 for holding the two-way nail according to another embodiments of the present invention. In the tool 50, three recesses 54/55 are formed in each of the first end portion 52 and the second end portion 53. The recesses can have various diameters.

Figure 4:
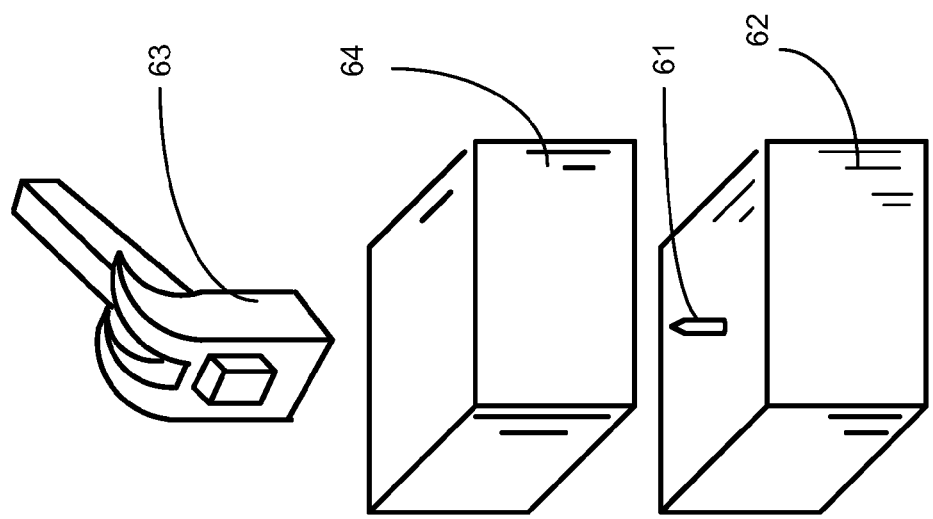
FIG. 4 shows the use cases of the two-way nails.
Figure 4:
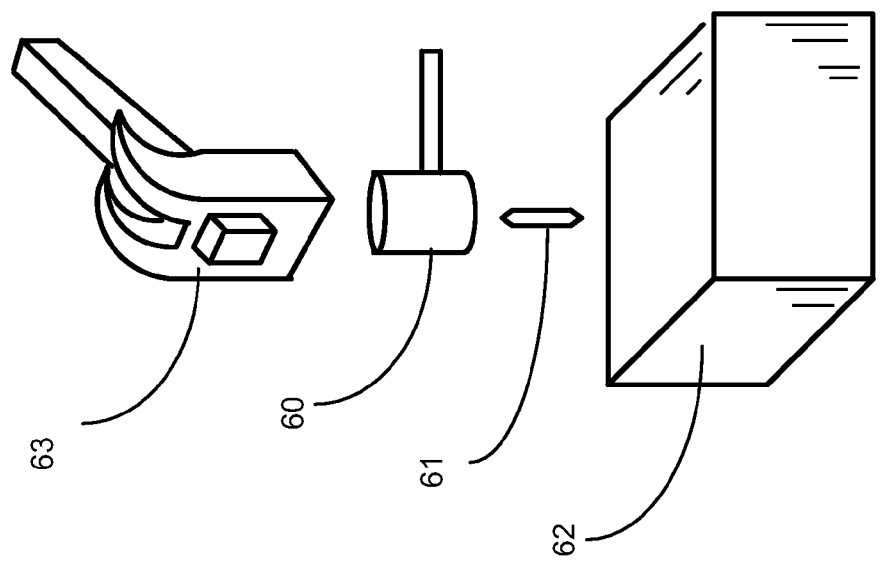

The usage of the two-way nails and the corresponding nail holder (tool) is shown in FIG. 4. First, the holder 60 is used to hold a two-way nail 61, then a force is applied to the holder 60 to drive the nail 61 into a first an object 62. Next, the holder 60 is removed, and a second object 64 is positioned over the first object 62. Then a force is applied to the second object 64 to cause the nail 61 to be nailed into the second object 64, thereby, mounting the two objects 62 and 64 together.

Two-Way Nails with Narrow Middle-Section

Figure 5:
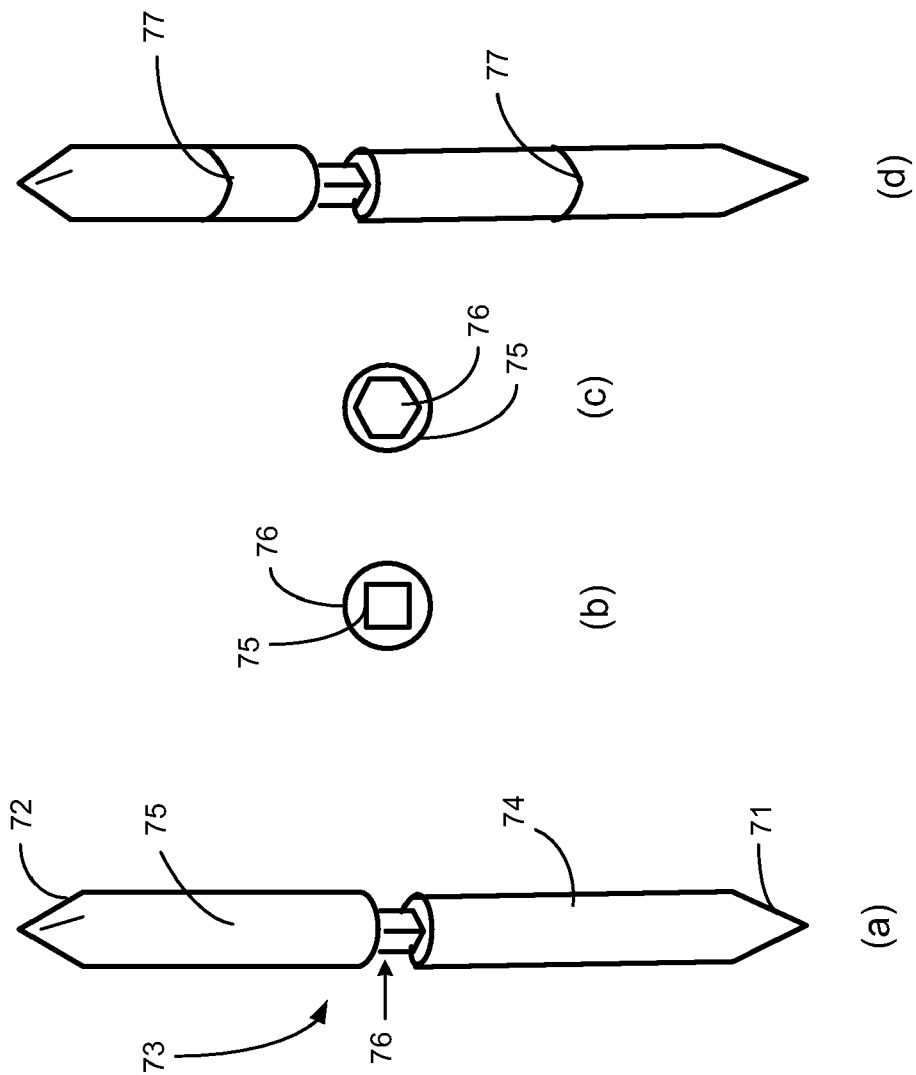
FIG. 5 shows two-way nails with narrow middle-section/neck according to one embodiment of the present invention.

FIG. 5 shows another two-way nail (a mounting member) useable for fastening two objects together. The two-way nail 70 has a first end portion 71 and an opposite, second end portion 72 defining a shank 73 therebetween, where each of the first and second end portions 71 and 72 is formed with a tapered tip. The shank 73 has a first portion 74, a second portion 75 and a neck portion (narrow middle-section) 76 formed therebetween.

Each of the first and second portions 74 and 75 of the shank 73 is formed with a cylinder having a diameter. The neck portion 76 of the shank 73 is formed with a cylinder or a polygonal column having a thickness that is less than the diameter.

The cross section of the neck portion 76 can be a circle, a polygon e.g. a square or a hexagon fully contained in a circle co-centered and with smaller diameter/radius in cross section than that of the nail. Here a square shape middle section is the most efficient one which allows the most contact area between the nail and the holding tool during nailing. The nail 70 may have marks 77 formed on the exterior surface of the shank 73.

Wrench for the Two-Way Nails with Narrow Middle-Section

Figure 6:
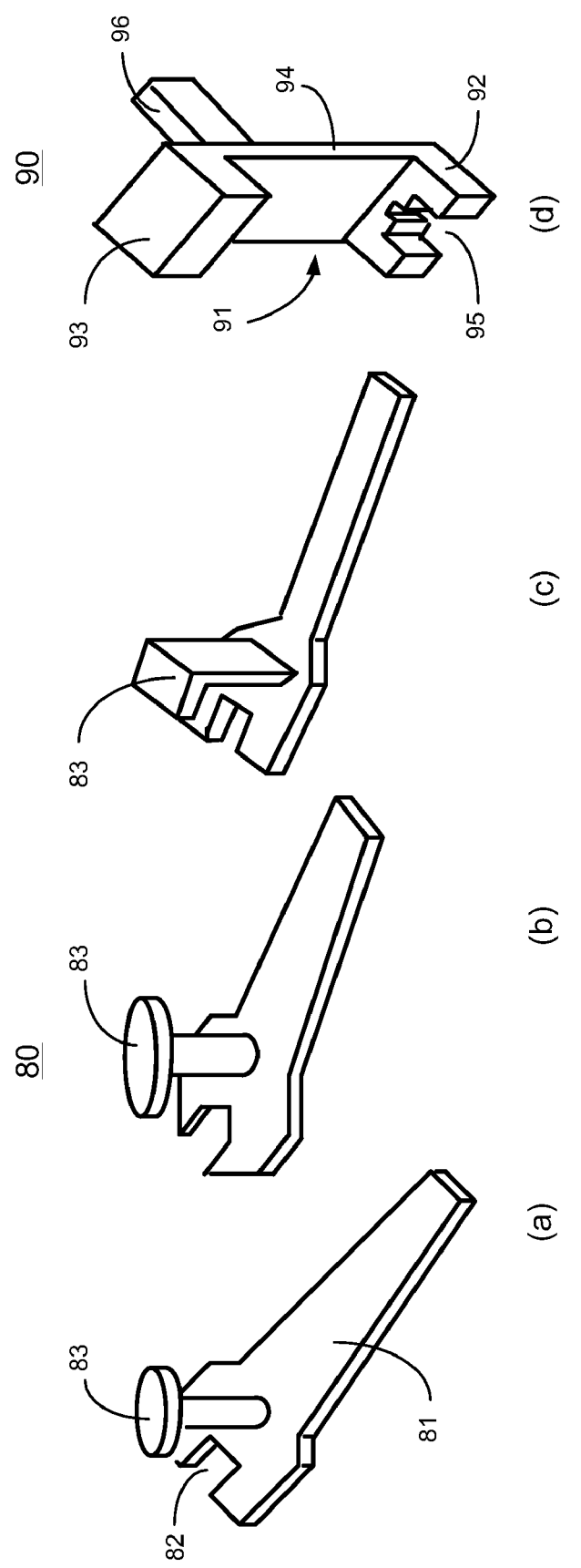
FIG. 6 shows wrench holders, a simple mounting tool for the two-way nails or screws with narrow middle-section/neck according to one embodiment of the present invention.

FIG. 6 shows the tool 80 having a wrench 81 having an open-end mouth portion 82 adapted for receiving the neck portion of the shank of the mounting member, and means for applying a force to the wrench, thereby causing the mounting member to advance into an object. The means for applying the force comprises a tab 83 formed on the wrench.

The tool can simply be a wrench, thin or thick, fixed or adjustable but normally fixed, with a hitting piece (tab) on top to be hit by a hammer in nailing the two-way nail to the first piece of material to be bound. The hitting piece can be an ellipse, a circle, or a polygon, and the tool is normal made by hard materials such as hard metals.

The tool 90 includes a holding member 91 having a first end portion 92 and a second end portion 93 defining a body portion 94 therebetween. The first and second end portions 92 and 93 have an angle of about 90° relative to the body portion 94. The first end portion 92 has an open mouth 95 adapted for receiving the neck portion of the shank of the mounting member. The second end portion is adapted for applying a force to the holding member 91, thereby causing the mounting member to advance into an object, and a handle 96 protruded from the body portion 94 of the holding member 91.

Holder for the Two-Way Narrow Middle-Section Nails and Screws

Figure 7:
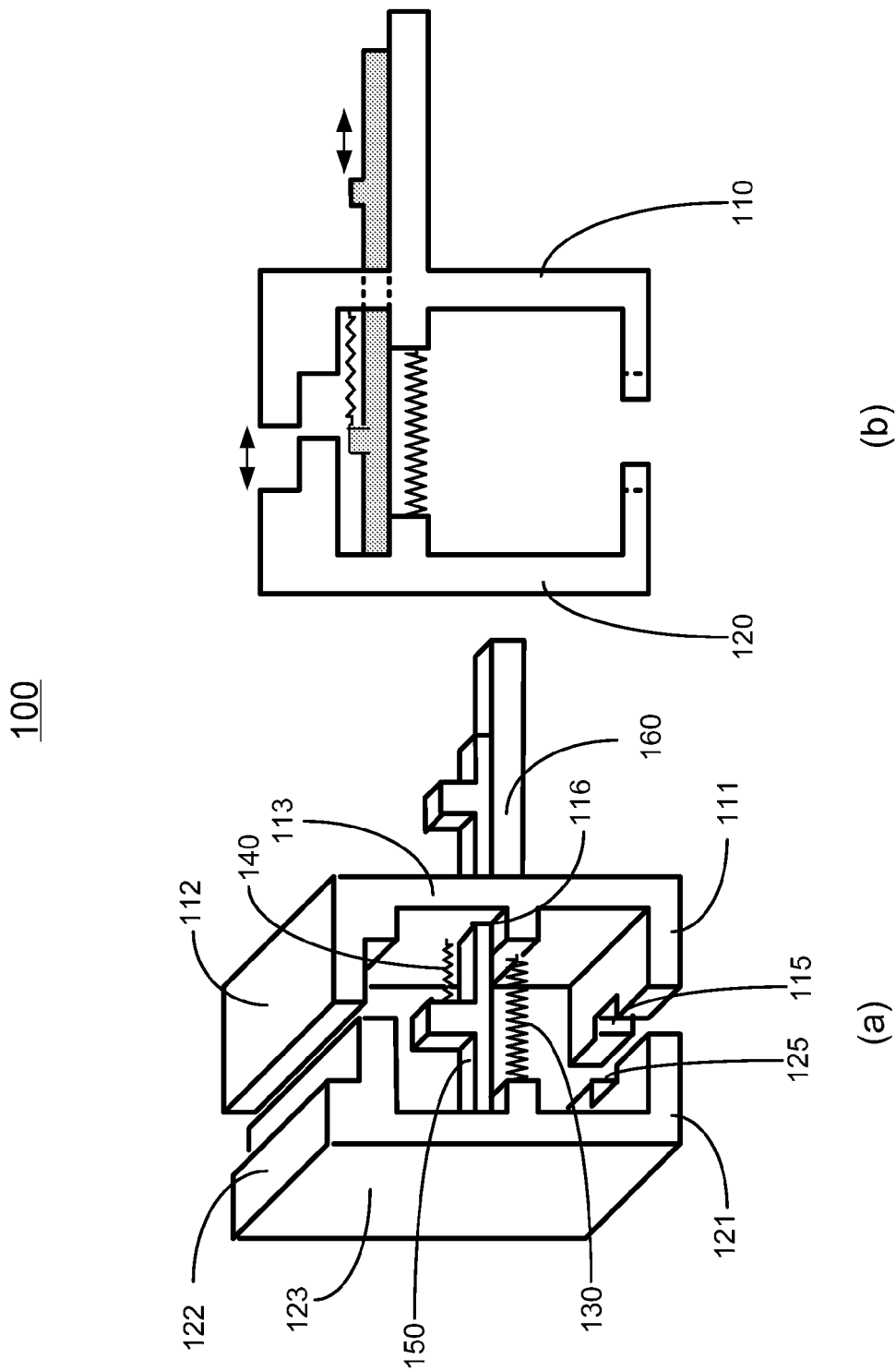
FIG. 7 shows a mounting tool for the two-way nails or screws with narrow middle-section/neck according to one embodiment of the present invention.
Figure 8:
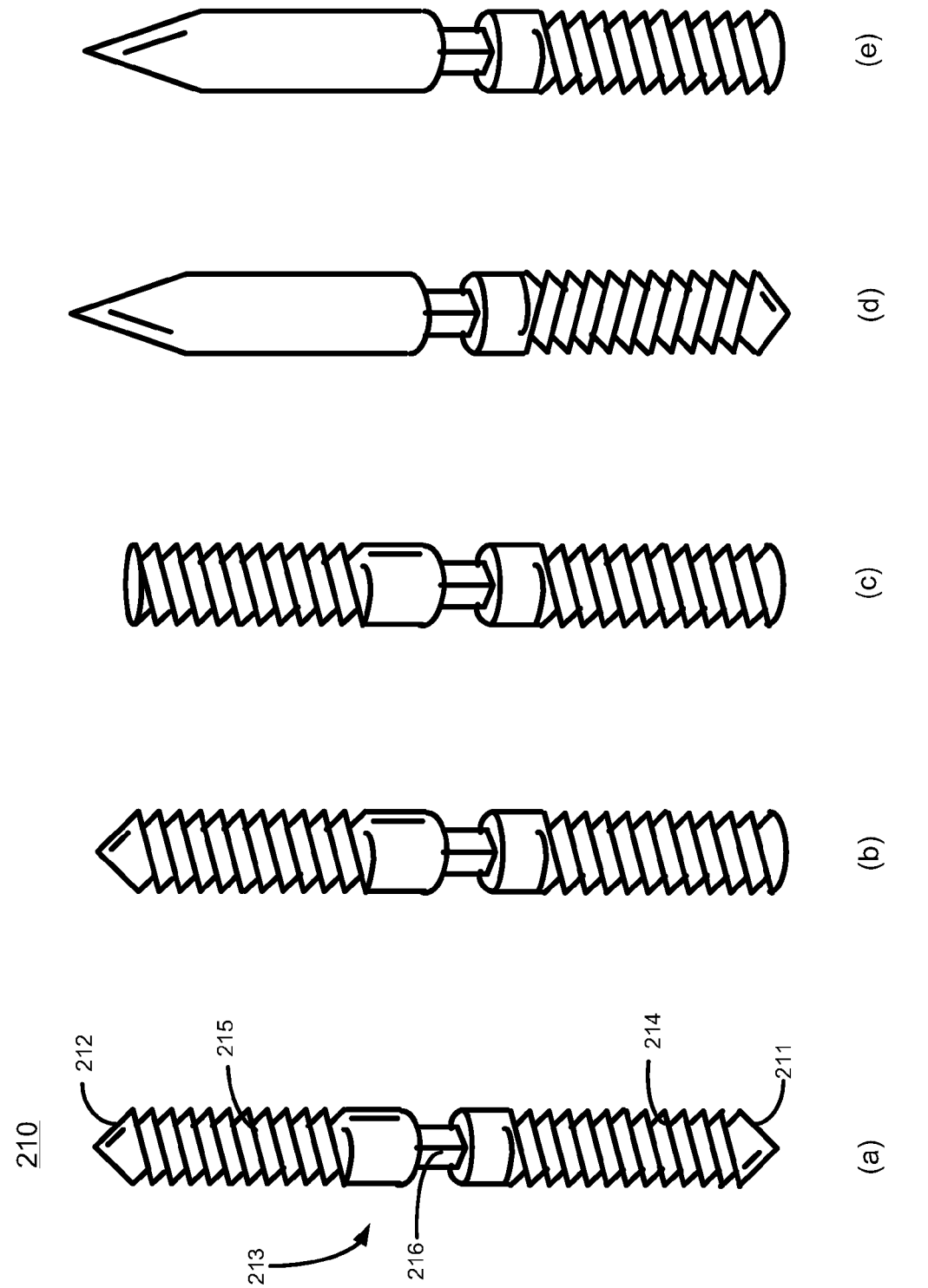
FIG. 8 shows two-way screws with narrower middle-section/neck according to embodiments of the present invention.
Figure 9:
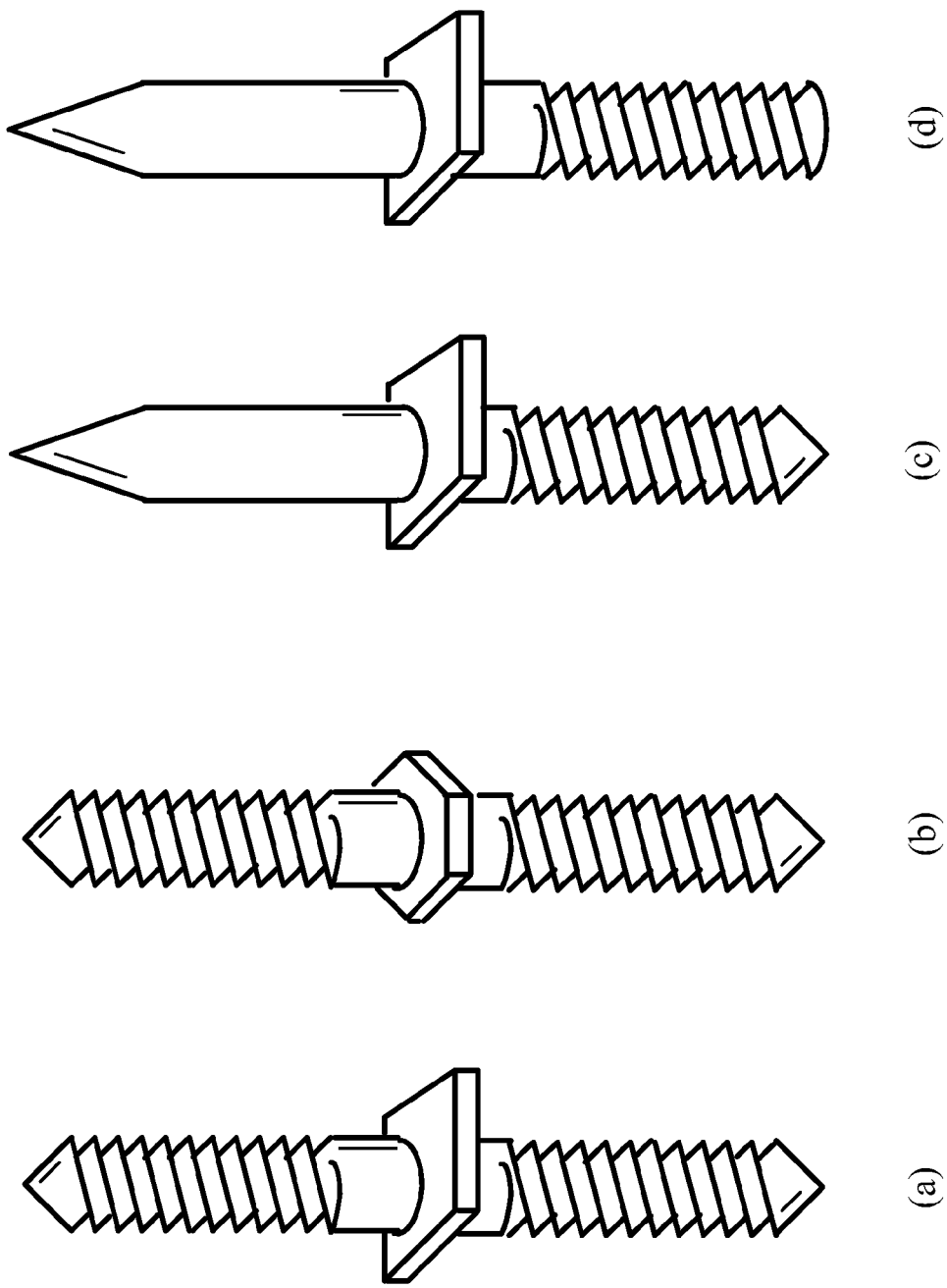
FIG. 9 shows two-way screws with stopper or wider middle-section/neck according to one embodiment of the present invention.

FIG. 7 shows a tool according to one embodiment of the present invention. The tool 100 includes a first holding member 110, a second holding member 120, a first spring 130, a second spring 140, a bar 150 and a handle 160. Each of the first and second springs 130 and 140 has a contracted position and an expended position. The tool 100 is operably in a locking position in which the first and second springs 130 and 140 are in their contracted positions and a releasing position in which the first and second springs 130 and 140 are in their expended positions. With this tool, a user can easily grab the narrow middle-section of the narrow middle-section/neck of the nails or even screws shown in FIGS. 5 and 8, and then use a hammer to hit its top part for nailing a two-way nail disclosed in the invention.

The first holding member 110 has a first end portion 111 and a second end portion 112 defining a body portion 113 therebetween. The first and second end portions 111 and 112 have an angle of about 90° relative to the body portion 113. The first end portion 111 has an open mouth 115. The body portion 113 defines an opening 116 therethrough.

The second holding member 120 has a first end portion 121 and a second end portion 122 defining a body portion 123 therebetween. The first and second end portions 121 and 122 have an angle of about 90° relative to the body portion 123. The first end portion 121 has an open mouth 125.

The first spring 130 connects the first and second holding members 110 and 120 such that when the first spring 130 is in the contracted position, the first and second end portions 111 and 112 of the first holding member 110 are respectively engaged with the first and second end portions 121 and 122 of the second holding member 120, and the open mouths 115 and 125 of the first and second holding members 110 and 120 are complementarily received the neck portion of the shank of the mounting member, which corresponds to the locking porision of the tool 100, and when the first spring 130 is in the expended position, the first and second end portions 111 and 112 of the first holding member 110 are respectively apart from the first and second end portions 121 and 122 of the second holding member 120, thereby, releasing the neck portion of the shank of the mounting member received in the open mouths 115 and 125 of the first and second holding members 110 and 120, which corresponds to the releasing porision of the tool 100.

The bar 150 is slidable through the opening 116 of the first holding member 110, adapted for causing the first spring 130 in the contracting position or the expanding position.

The second spring 140 connects to the first holding member 110 and the bar 150 such that when the second spring 140 is in its contracted position, it causes the first spring 130 in the contracted position, and when the second spring 140 is in its expended position, it causes the first spring 130 in the expended position.

The handle 160 is protruded from the body portion 113 of the first holding member 110.

Initially, the tool 100 is in the locking position. In use, a user applies a force to the bar 150 to cause the first and second springs 130 and 140 in their expended positions, as shown in FIG. 7(b), thereby, causing the tool 100 in the releasing position. Then, the user places the neck portion of the shank of the mounting member shown in FIGS. 5 and 8, in the open mouths 115 and 125 of the first and second holding members 110 and 120. Once the applied force is removed, the tool 100 moves in the locking position in which the neck portion of the shank of the mounting member is received in the open mouths 115 and 125 of the first and second holding members 110 and 120. Then, the user can use a hammer to hit the tool top to mount the mounting member in a place of interest. Once the mounting member is mounted to the place, the user can release the mounting member from the tool 100 by applying a proper force to the bar 150 to cause the tool 100 in the releasing position. A user can also use it to hold a two-way screw in a similar manner.

The tool can be made with any strong and robust materials such as metals or hard plastics, certainly the springs can be made with strong elastic metals. The tool can be made at any size suitable for a human hand to operate.

Two-Way Screws with Narrow Middle-Section (Neck Portion)

FIG. 8(a) shows a two-way screw (a mounting member) useable for fastening two objects together. The two-way screw 210 has a first end portion 211 and an opposite, second end portion 212 defining a shank 213 therebetween, where each of the first and second end portions 211 and 212 is formed with a tapered tip. The shank 213 has a first portion 214, a second portion 215 and a neck portion (narrow middle-section) 216 formed therebetween.

Each of the first and second portions 214 and 215 of the shank 213 is formed with a cylinder having a diameter. The exterior surface of the cylinder is threaded helically. The neck portion 206 of the shank 213 is formed with a cylinder or a polygonal column having a thickness that is less than the diameter.

The thread direction on each side can be the same, i.e. both can move forward when the two-way screw is driven in counter clock wisely (CCW). Similar to the two-way nails with narrow middle-section, the narrow middle section can be in shape of square, hexagon, or other polygons. In general, the narrow middle-section shall be small enough, so the vertices of its cross section shall be fully contained inside the circular cross section of the screw itself, but it shall not be too small to lose its strength to bind two pieces of materials. Also it shall be long enough to just give sufficient space for holding/mounting tool described above.

FIGS. 8(b)-8(e) show different embodiments of the two-way screw with narrow middle-section (neck portion). The variations are (b) with one sharp end and one flat end, (c) with both flat ends, (d) with one sharp end and one nail end, i.e. a half screw and half nail, and (e) with one flat end and one nail end, i.e. also a half screw and half nail. They all can be useful under certain circumstances.

In principle, the type of the two-way screws with narrow middle-section can be made by any hard material suitable for screws, at any thickness (diameter) or length, with any thread gaps and directions.

Two-Way Screws with Wide Middle-Section (Neck Portion)

FIG. 10 shows different embodiments of a two-way screw (mounting member) with wide middle-section. It is essentially a variation of the invented two-way screw with narrow middle-section, and is similar to the invented two-way nails with a thin stopper. The middle-section section can be a ring, square, hexagon, or other polygons. Since the middle-section is wider/larger than the screw/nail cross section, user may need to recess one or both pieces of the material to be bound, which may limit the usage of this kind of nails. The variations of the two-way screws are also shown in FIG. 10, with a combination of (a) sharp screw end, (b) fiat screw end, and (c) nail end for both ends.

In principle, the type of the two-way screws with narrow middle-section can be made by any hard material suitable for screws, at any thickness (diameter) or length, with any thread gaps and directions.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A tool and mounting member in combination, the tool for holding the mounting member, the mounting member comprising:
a first end portion and an opposite, second end portion defining a shank therebetween, wherein at least one of the first and second end portions is formed with a tapered tip, wherein the shank has a first portion, a second portion and a neck portion formed therebetween, wherein each of the first and second portions of the shank is formed with a cylinder having a diameter, and wherein the neck portion of the shank is formed with a cylinder or a polygonal column having a thickness that is less than the diameter; and
the tool comprising:
a first holding member having a first end portion and a second end portion defining a body portion therebetween, wherein the first and second end portions have an angle of about 90° relative to the body portion, wherein the first end portion has an open mouth, and wherein the body portion defines an opening therethrough;
a second holding member having a first end portion and a second end portion defining a body portion therebetween, wherein the first and second end portions have an angle of about 90° relative to the body portion, wherein the first end portion has an open mouth;
a first spring connecting the first and second holding member such that when the first spring is in a contracted position, the first and second end portions of the first holding member are respectively engaged with the first and second end portions of the second holding member, and the open mouths of the first and second holding members are complementarily received the neck portion of the shank of the mounting member, and when the first spring is in an expended position, the first and second end portions of the first holding member are respectively apart from the first and second end portions of the second holding member, thereby, releasing the neck portion of the shank of the mounting member received in the open mouths of the first and second holding members;
a bar slidable through the opening of the first holding member, adapted for causing the first spring in the contracted position or the expended position; and
a second spring connecting to the first holding member and the bar such that when the second spring is in a contracted position, it causes the first spring in the contracted position, and when the second spring is in an expanded position, it causes the first spring in the expanded position.

2. The tool and mounting member of claim 1, wherein the tool further comprises a handle protruded from the body portion of the first holding member.

3. The tool and mounting member of claim 1, wherein at least one of the first and second portions of the shank of the mounting member has a threaded exterior surface.

* * * * *